United States Patent
Wen

(10) Patent No.: US 6,647,126 B1
(45) Date of Patent: Nov. 11, 2003

(54) AUTHORIZING THE PRODUCTION OF VISUAL IMAGES FROM DIGITAL IMAGES

(75) Inventor: Xin Wen, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/493,531

(22) Filed: Jan. 28, 2000

(51) Int. Cl.[7] .................. G06K 9/62; G06K 15/00; H04L 9/00
(52) U.S. Cl. .................. 382/100; 382/232; 713/176; 358/3.28
(58) Field of Search .................. 382/100, 232; 380/54, 210, 252, 287; 713/176; 358/3.28

(56) References Cited

U.S. PATENT DOCUMENTS

| | | | |
|---|---|---|---|
| 3,889,056 A | * 6/1975 | Mayer et al. | 380/54 |
| 4,972,476 A | * 11/1990 | Nathans | 713/186 |
| 5,027,401 A | * 6/1991 | Soltesz | 380/54 |
| 5,231,663 A | * 7/1993 | Earl et al. | 382/159 |
| 5,636,292 A | 6/1997 | Rhoads | |
| 5,673,320 A | * 9/1997 | Ray et al. | 713/176 |
| 5,752,152 A | * 5/1998 | Gasper et al. | 399/366 |
| 5,832,100 A | * 11/1998 | Lawton et al. | 382/100 |
| 5,919,730 A | * 7/1999 | Gasper et al. | 503/201 |
| 5,983,065 A | * 11/1999 | Folkins et al. | 399/366 |
| 6,026,166 A | * 2/2000 | LeBourgeois | 713/156 |
| 6,028,940 A | * 2/2000 | Tanaka et al. | 380/54 |
| 6,044,156 A | * 3/2000 | Honsinger et al. | 380/54 |
| 6,045,881 A | * 4/2000 | Gasper et al. | 428/29 |
| 6,085,181 A | * 7/2000 | Gravell et al. | 705/408 |
| 6,103,353 A | * 8/2000 | Gasper et al. | 428/195 |
| 6,175,714 B1 | * 1/2001 | Crean | 399/366 |
| 6,256,398 B1 | * 7/2001 | Chang | 382/100 |
| 6,282,573 B1 | * 8/2001 | Darago et al. | 709/229 |
| 6,311,214 B1 | * 10/2001 | Rhoads | 709/217 |
| 6,314,409 B2 | * 11/2001 | Schneck et al. | 705/54 |
| 6,327,580 B1 | * 12/2001 | Pierce et al. | 705/401 |
| 6,340,931 B1 | * 1/2002 | Harrison et al. | 340/572.1 |
| 6,421,450 B2 | * 7/2002 | Nakano | 382/100 |
| 6,523,113 B1 | * 2/2003 | Wehrenberg | 713/176 |
| 6,530,021 B1 | * 3/2003 | Epstein et al. | 713/176 |

* cited by examiner

*Primary Examiner*—Bhavesh M. Mehta
*Assistant Examiner*—Christopher Sukhaphadhana
(74) *Attorney, Agent, or Firm*—Peyton C. Watkins

(57) ABSTRACT

A method for authorizing the making of a visual image from a digital image includes receiving the digital image having embedded authorization information, extracting the authorization information from the digital image, and verifying that the extracted embedded authorization information permits an imaging device to form the visual image of the digital image. After the verifying step, the imaging device forms the visual image from the digital image.

14 Claims, 1 Drawing Sheet

AUTHORIZING THE PRODUCTION OF VISUAL IMAGES FROM DIGITAL IMAGES

CROSS REFERENCE TO RELATED APPLICATIONS

Reference is made to commonly-assigned U.S. Pat. No. 6,044,156, issued Mar. 28, 2000, entitled "Method For Generating An Improved Carrier For Use In An Image Data Embedding Application," by Honsinger et al, the disclosure of which is incorporated herein.

FIELD OF THE INVENTION

The present invention relates to the authorization of producing visual images from digital images.

BACKGROUND OF THE INVENTION

Images can be viewed by many different types of imaging devices: they can be displayed on a monitor such as a liquid crystal display (LCD), a cathode ray tube monitor (CRT), or an organic light emitting diode display (OLED). They can be printed on a reflective or transparent receiver by a printer. They can also be projected onto a screen using a projector to present a static image or motion images. The imaging devices are usually located at different sites. In addition, many of the digital images are protected by copyright. Adequate authorization methods need to be set up for the users to get permission to use the digital images. Modern communication and computing technologies provide convenience for using digital images at different locations. The digital images can be used to produce images on a display or printing images on receivers.

SUMMARY OF THE INVENTION

An object of the present invention is to provide an effective authorization method for using digital images.

This object is achieved by a method for authorizing the making of a visual image from a digital image, comprising the steps of:

a) receiving the digital image having embedded authorization information;

b) extracting the authorization information from the digital image;

c) verifying that the extracted embedded authorization information permits an imaging device to form the visual image of the digital image; and d) after the verifying step using the imaging device to form the visual image from the digital image.

An advantage of the present invention is that the authorization of the use of digital images can be provided for users at different and remote locations.

A feature of the present invention is that the authorization information is embedded in the digital image and is therefore an integral part of the digital image.

Another feature of the present invention is that the permission to use an digital image can be readily facilitated.

DETAILED DESCRIPTION OF THE INVENTION

Figure 1:
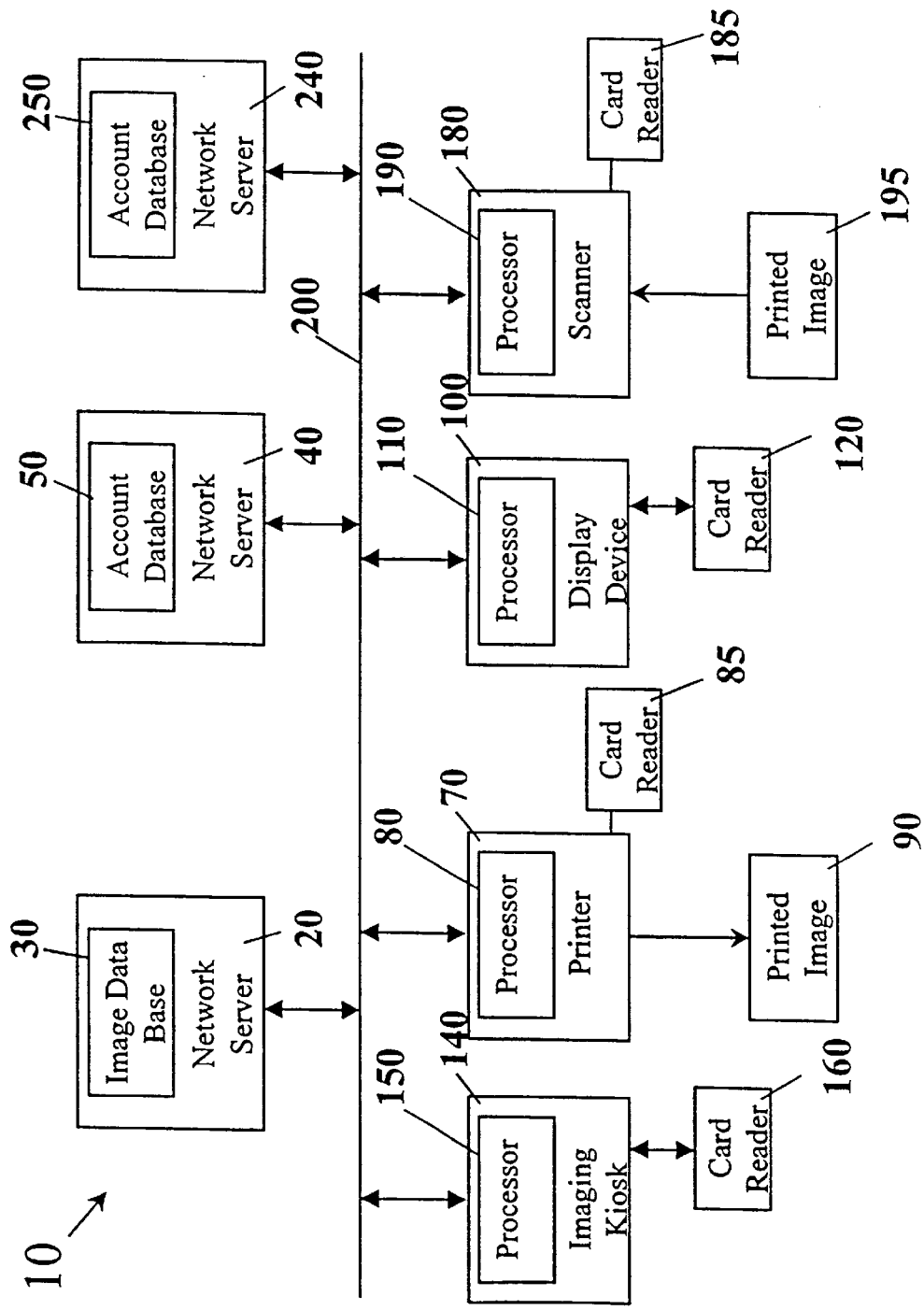
FIG. 1 illustrates the system for providing the service of producing visual images using digital images in accordance with the present invention.

This invention relates to a method for authorizing producing a visual image on an imaging device. In this disclosure, the term imaging device can include any devices that can form a visual image, for example, a display device, a printer, or a projector. A display device can be, for example, a liquid crystal device (LCD), a cathode ray tub monitor (CRT), or an organic light emitting diode display (OLED). The monitor can be self-standing or hand held. A projector projects a static image or motion images on a screen, which are exemplified by a LCD light valve or digital mirror technologies. A printer can be an ink jet printer, a thermal resistive printer, a laser (electrophotographic) printer, or a digital silver halide printer.

FIG. 1 illustrates the imaging and authorization system 10 for providing the service of producing visual images using digital images in accordance with the present invention. The imaging and authorization system 10 includes a first network server 20 having an image database 30, a second network server 40 having an account database 50, a printer 70 having a processor 80 for 10 producing printed image 90, a display device 100 having a processor 110, and an imaging kiosk 140 having a processor 150. The imaging and authorization system 10 can also include a scanner 180 having a processor 190. The scanner 180 scans a printed image 195.

The imaging devices can be located adjacent to each other or installed at different locations such as shopping malls, airports or train stations, movie cinema, entertainment parks, or supermarkets. The first network server 20 having the image data base 30 is installed at a service provider that provides the digital images that are used at various imaging devices. The imaging devices can also include a compact disc (CD) writer for recording the digital image on a recordable CD such as a digital versatile disc (DVD) and versatile compact disc (VCD). The account database 50 at the second network server 20 stores and manages the account information of the service provider for collecting the payment for the usage of the imaging devices.

The imaging devices described above produce visual images in response to the request of the users. The visual image can be produced by displaying on a monitor or by printing on a reflective or transmissive receiver such as paper or synthetic material. The user can select at least one property for producing such visual images. For the printer 70, for example, the selectable image properties includes image size, the number of the visual images, the properties of the imaging device including the printer type, the printing resolution, the properties of the colorants, the receiver type, and the print finish. The selectable properties can also include imaging processing operations for enhancing the features or the quality of the visual images. The image processing operations include adjusting tone scale, adjusting color balance, adjusting color saturation, reducing red-eye, sharpening of softening the image, reducing blur, cropping, zooming, inserting the digital image into an image template, adding text or annotation into the image, and retouching the image.

A communication channel 200 electronically connects the network servers 20 and 40, the printer 70, the display device 100, the imaging kiosk 140, and the scanner 180 for providing communication between these devices. The communication channel 200 can exist in different physical and software forms. For example, the communication channel 200 can include an Internet or a local network. They can be built with an optical-fiber cable, a co-axial cable, telephone line, satellite transmission system, and wireless radio-wave transmission. The communication over the communication channel, 200 can use different protocols such as the World Wide Web, and file transfer protocol (FTP).

The imaging and authorization system 10 also includes a third network server 240 associated with a bank which holds the account of a user of the imaging devices. The third network server 240 includes an account database 250 that stores and manages the account information for the user of the imaging devices such as the printer 70, the display device 100, the imaging kiosk 140, and the scanner 180.

The image database 30 stores a plurality of digital images having embedded image-access information. The image-access information includes authorization information. The authorization information is used for permitting a user to produce a visual image at an imaging device. The authorization information may permit the use with and without charge of the digital image for forming a visual image on an imaging device. The authorization information may also prohibit the use of the digital image for certain applications. The authorization information can also authorize the operation of a device. For example, the authorization information can authorize the copying operation of a compact disc writer to copy the digital image files: from a memory to a recordable disc. The authorization information can authorize the use of a software stored in an imaging device or a computer.

The image-access information can also include information about the receiver of payment for the imaging services using these digital images. An example of the receiver of payment is the service provider for the imaging services. The image-access information can also include the web or e-mail address of the receiver of the payment such as the service provider. In the present invention, an image service can include capturing, processing, printing, copying, scanning, and reproducing of images in an electronic device or to or from a receiver.

For providing imaging services to the user at an imaging device such as the printer 70, the display device 100, imaging kiosk 140 or a scanner 180, the imaging device receives digital images from the image database 30. Image-access information is embedded in the digital image. The embedded image-access information is preferably invisible when a visual image is produced from the digital image. After the digital images are received, the embedded image-access information is extracted from the digital images, as described below, in the processors 70, 100, 140, 180 that are located within or near each of the imaging devices.

Each of the printer 70, the display device 100, the imaging kiosk 140, and the scanner 180 is respectively connected to a card reader 85, 120, 160, 185, which are in turn connected with the information channel 200 The card readers 85, 120, 160, 185 can read account information by scanning a credit card or a bankcard corresponding to the third network server 240 or from manual input of an operator. The account information includes an identifier such as a bank account number that specifies the user's bank account. The payment of the imaging service is to be debited toward the user's account. The payment is accomplished by transferring funds from the identifier specified account to the receiver of payment. The bank card readers 85, 120, 160, or 185 can communicate with the second network server 40 and the third network server 240 through the communication channel 200. The bank card readers 85, 120, 160, or 185 manage and record payment transactions for the imaging services using the receiver-account information extracted from the digital image and the user-account information read from a bankcard.

In accordance with the present invention, the payment billed to the user's account is dependent on the type of imaging service requested by the user. The image assess information embedded in the digital image sent from the image database 30 to the imaging devices can include selectable image properties for the imaging service. Different imaging properties result in different amounts of payment from the user's account.

The selectable image properties can include a plurality of imaging programs that provide features to the visual image to be produced on a receiver or a monitor. For example, the imaging programs can include adjusting tone scale, adjusting color balance, adjusting color saturation, reducing red-eye, sharpening of softening the image, reducing blur, cropping, zooming, inserting the digital image into an image template, adding text into the image, and retouching the image. The selectable image properties can also include image size and the number of the visual images to be produced. The selectable image properties can also include properties of the imaging device such as the printer or the scanner type, the printing resolution, the properties of the colorants, the receiver type, and the type of print finish. These device properties often determine the quality of the visual images as well as the cost to the service provider. For example, an ink image produced on a photo quality receiver by a 6-ink ink jet printer will cost more than an ink image printed on a plain paper using a 4-ink ink jet printer.

Before the visual image is finalized, the user can preview the improved (i.e. processed or modified) image on a monitor. The user can order the final visual image such as the number or the size of the visual images according to her satisfaction with the preview image. After the order is made for the imaging service, the proper charge is debited from the user's account to the receiver of the payment based on the selected image property. The visual image having the image property is subsequently produced on the imaging device.

The embedding and extraction of image-access information in the digital image is now described. A digital image $I(x,y)$ is stored in image database 30. The image-access information is embedded into the digital image $I(x,y)$ by modifying the pixel values in $I(x,y)$ to produce a modified digital image $I'(x,y)$ having the embedded image-access information. The image-access information can be encrypted before embedding.

The embedding of the image-access information starts with producing a message image $M(x,y)$. The message image $M(x,y)$ can include alphanumeric or graphic information associated with the image-access information. A carrier image $C(x,y)$ is also generated with a uniform or flat Fourier amplitude spectrum and a phase spectrum generated using a random number generator for each phase component. The random phase is required to distribute the message image to make the message invisible and unreadable to human eyes.

The message image $M(x,y)$ and the carrier image $C(x,y)$ are then convolved to form a distributed signal $S(x,y)$.

$$S(x,y)=M(x,y)*C(x,y) \qquad (1)$$

In eqn. (1), the symbol "*" denotes the mathematical operation of convolution, for example, a circular convolution.

The distributed signal $S(x,y)$ is next added to the digital image $I(x,y)$ to produce a modified digital image $I'(x,y)$ carrying the embedded information:

$$I'(x,y)=I(x,y)+\alpha S(x,y) \qquad (2)$$

The distributed signal $S(x,y)$ is scaled by a scale factor $\alpha$ to maximize the signal of the embedded image-access information while ensuring the invisibility of the distributed message in the modified digital image I'(x,y). That is, the value of α can also be chosen for optimizing image quality.

The reliability of extracting the embedded information can be improved by superimposing a plurality of blocks of distributed signals S(x,y) to each color plane of the processed digital image I(x,y). Each of the blocks can be, for example, 64×64, 128×128, or 256×256 pixels in size. For a 300 dpi or 600 dpi printer, these blocks represent a small area (smaller than I square inch) on the printed identification document. The redundancy in the distributed signals S(x,y) increases the signal-to-noise ratio in the extraction of embedded information from modified digital image I'(x,y). In the present invention, the term extracting is used to refer the action of retrieving information from an image or visual textual information.

The modified digital image I'(x,y) is transferred via the communication channel 200 to an imaging device such as the printer 70. The image-access information is extracted from the modified digital image I'(x,y) in the processors 70, 100, 150, 180. The extraction of the embedded image-access information from the modified image I'(x,y) involves cross-correlating I'(x,y) with the carrier image C(x,y) to obtain the message image M(x,y). If the image-access information is encrypted, the image-access information is subsequently decrypted from the extracted information by the processors 70, 100, 150, 180 at the imaging devices.

The authorization information extracted from the digital image as part of the image-access information includes a description whether and how the digital image can be used on an imaging device. For example, the authorization information may permit the use of the digital image for forming a visual image on an imaging device with or without charge to the user. The authorization information may also prohibit the use of the digital image for certain applications. The authorization information can also authorize the operation of a device other than the formation of a visual image. For example, the authorization information can authorize the copying operation of a compact disc writer to copy the digital image files from a memory to a recordable disc. The authorization information can authorize the use of a software stored in an imaging device or a computer.

The extracted authorization information can be compared with pre-stored information in an electronic memory connected to the imaging device. The pre-stored information can include a description of the types of imaging service that can be provided by the specific imaging device. The pre-stored information can also include a key for decrypting the encrypted authorization information. The pre-stored information can also include information input from the user of the imaging device such as identification of the user. The authorization information sometimes defines which users are authorized to use the digital image to form visual images. These users may have made payment arrangement (e.g. monthly charges or membership charges) or established credits with the service provider.

Based on the authorization information and the comparison with the pre-stored information the imaging device can approve or deny the use of the digital image for forming visual images.

Details about embedding and extracting information in a digital image have been disclosed in commonly-assigned U.S. Pat. No. 6,044,156, issued Mar. 28, 2000, entitled "Method For Generating An Improved Carrier For Use In An Image Data Embedding Application," by Honsinger et al. The data embedding technique disclosed in U.S. Pat. No. 5,636,292 is also compatible with the present invention. The disclosures in these references are hereby incorporated in regard to embedding and extracting image-access information in the digital images stored in the image database 30.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention. The computer program can be stored on a storage medium in or connected to the imaging device or in one or more of the network servers.

The invention has been described in detail with particular reference to certain preferred embodiments thereof, but it will be understood that variations and modifications can be effected within the spirit and scope of the invention.

PARTS LIST 10 imaging and authorization system
20 first network server
30 image database
40 second network server
50 account database
70 printer
80 processor
85 card reader
90 printed image
100 display device
110 processor
120 card reader
140 kiosk
150 processor
160 card reader
180 scanner
185 card reader
190 processor
195 printed image
200 communication channel
240 third network server
250 account database

What is claimed is:

1. A method for authorizing the making of a visual image from a digital image, comprising the steps of:
   a) storing the digital image having embedded authorization information embedded in the digital image which embedded information is visually imperceptible to a human eye and which does not visually impair the digital image;
   b) extracting the authorization information from the digital image;
   c) addressing the memory and causing the digital image to be delivered to an imaging device at a remote location;
   d) verifying that the extracted embedded authorization information permits the imaging device to form the visual image of the digital image; and
   e) after the verifying step using the imaging device to form the visual image from the digital image.

2. A method for authorizing and making payment for the making of a visual image from a digital image, comprising the steps of:
   a) storing the digital image having embedded authorization information and image-access information embedded in the digital image which embedded information is visually imperceptible t o a human eye and which does not visually impair the digital image;

b) addressing the memory and causing the digital image to be delivered to an imaging device at a remote location;

c) extracting the authorization information and the image-access information from the digital image, the image-access information including the receiver of payment;

d) verifying that the extracted embedded authorization information permits the imaging device to form the visual image of the digital image;

e) making payment to the receiver of payment; and f) after the verification step using the imaging device to form the visual image from the digital image.

3. A method for producing a visual image having selected properties and for providing payment therefor, comprising the steps of:

a) storing the digital image having embedded image-access information, embedded in the digital image which embedded information is visually imperceptible invisible to a human eye and which does not visually impair the digital image, in an electronic memory, the image-access information including the receiver of payment and selectable image properties for which different payments are to be made;

b) accessing the electronic memory and extracting the image-access information from the digital image;

c) selecting at least one property from the selectable image properties for producing the visual image;

d) making payment to the receiver of payment based on at least in part one selected image property; and e) producing the visual image in response to the selected property and the digital image.

4. The method of claim 1 wherein the step of verifying includes approving or denying the making of the visual image based on whether the digital image is authorized.

5. The method of claim 1 wherein the step of verifying includes comparing the authorization information to a pre-stored information in an electronic memory connected to the imaging device.

6. The method of claim 1 wherein the embedded authorization information is invisible with unaided eyes.

7. The method of claim 1 further including displaying the authorization information on a monitor.

8. The method of claim 1 wherein the imaging device is a printer which produces the visual image on a receiver.

9. The method of claim 1 wherein the imaging device is a display device or a projector which displays the visual image.

10. The method of claim 1 wherein the imaging device includes a compact disc writer.

11. The method of claim 1 wherein the imaging device is a kiosk which processes, displays and prints the digital image.

12. The method of claim 3 further including previewing the digital image on a monitor before selecting image properties.

13. A computer program product stored on a computer-readable medium according to the method of claim 1.

14. A computer program product stored on a computer-readable medium according to the method of claim 1.

* * * * *